Nov. 13, 1923.                                                               1,474,033
                        A. G. HERRESHOFF
              SELECTIVE TYPE CHANGE SPEED TRANSMISSION
                    Filed Aug. 17, 1921           2 Sheets-Sheet 2
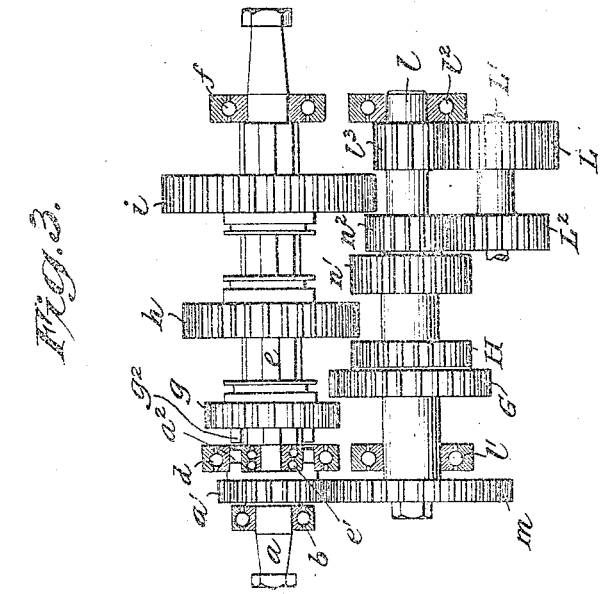
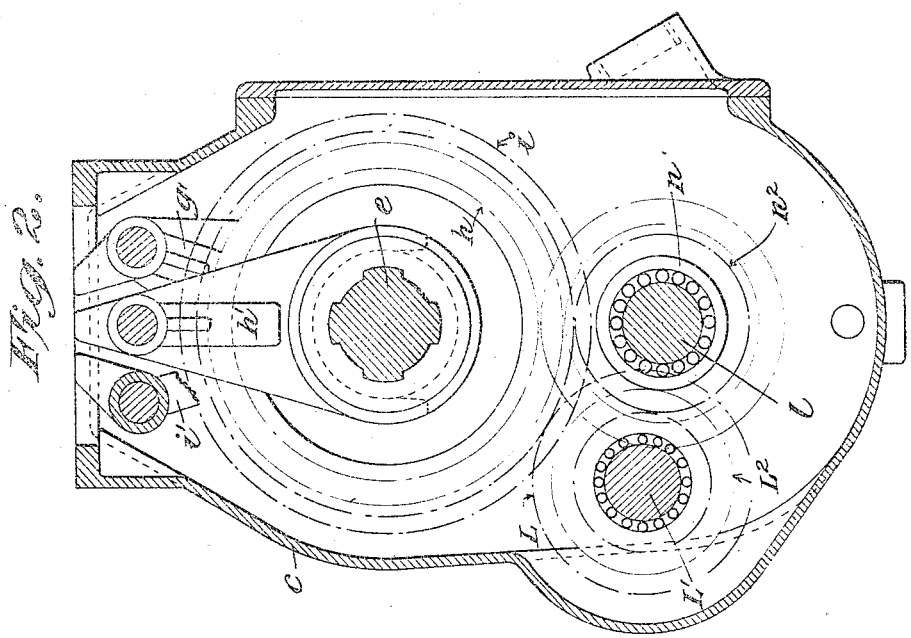
Inventor
Alexander Griswold Herreshoff
By his Attorneys Patented Nov. 13, 1923.

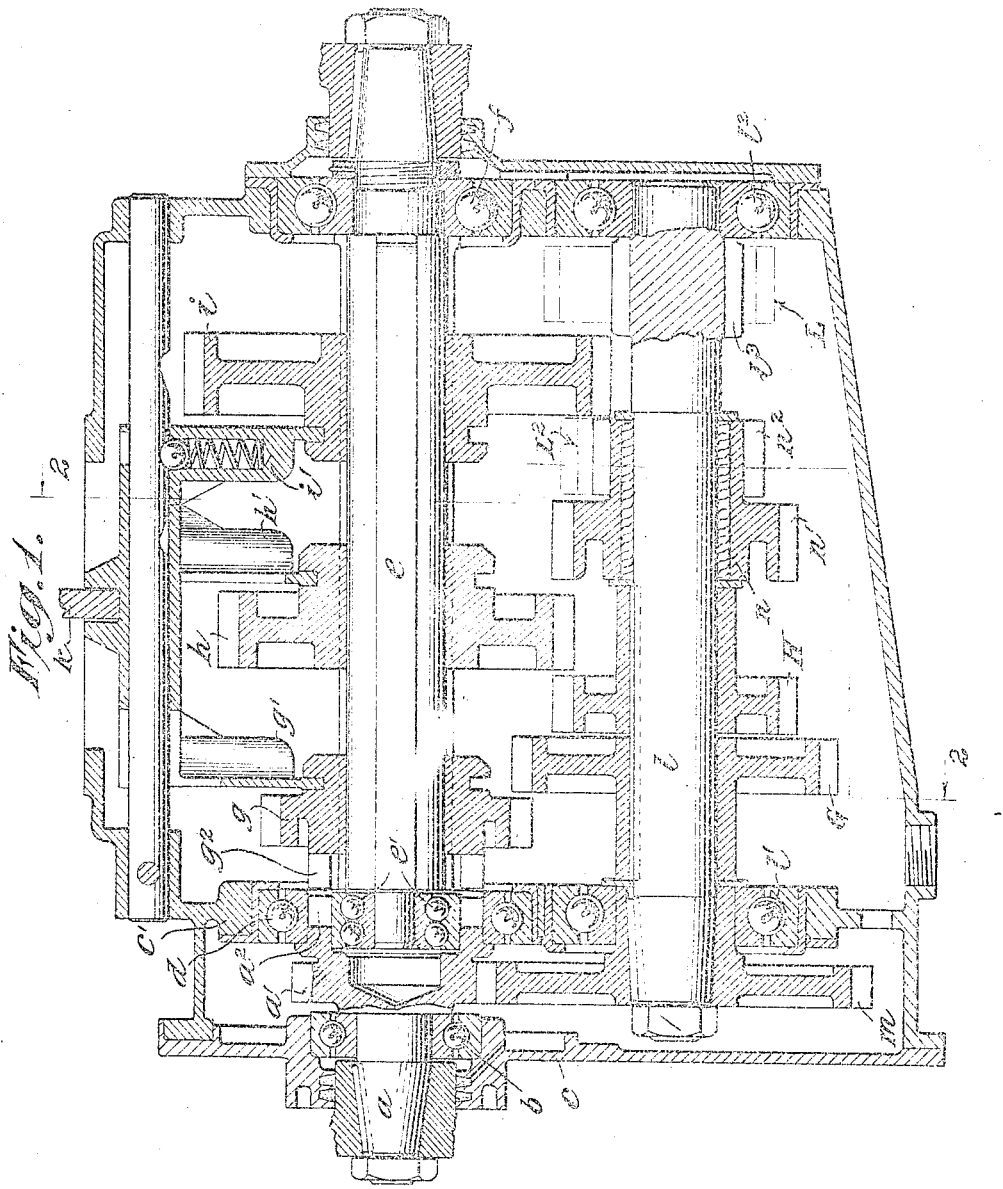

1,474,033

UNITED STATES PATENT OFFICE.

ALEXANDER GRISWOLD HERRESHOFF, OF BRISTOL, RHODE ISLAND.

SELECTIVE-TYPE CHANGE-SPEED TRANSMISSION.

Application filed August 17, 1921. Serial No. 493,032.

*To all whom it may concern:*

Be it known that I, ALEXANDER GRISWOLD HERRESHOFF, a citizen of the United States, residing in the city of Bristol, in the State of Rhode Island, have invented certain new and useful Improvements in Selective-Type Change-Speed Transmission, of which the following is a specification, reference being had to the accompanying drawings, forming a part hereof.

This invention relates to an improved change speed transmission of the selective type and is designed primarily with reference to its adaptation to five speeds forward and reverse. A transmission of this character to be practical and useful from both the engineering and the commercial standpoint must satisfy requirements which have not yet been met in five speed transmissions. The principal object of the present invention is to provide a construction which, when adapted to a five speed transmission, will make the box as available for ordinary automotive uses as the accepted type of three and four speed boxes now in vogue; that is to say, the improved transmission may be housed in a short compact box which not only permits it to be mounted on a chassis in accordance with accepted practise but also insures short stiff shafts with resulting quiet operation. The change speed gears themselves are all of relatively small diameter and vary one from another by slight degrees of graduation, all of the tooth speeds being low and the stresses about the same throughout. This design, as will be appreciated, makes for compactness and longer life. In realizing this advantage there has been provided in the improved transmission a compound reduction in two of the speeds (such as first and second), a compound sleeve having constant mesh gears being loosely supported on the counter shaft to effect this compound reduction when the appropriate gears on the spline shaft are meshed therewith A further feature of the improved transmission resides in the simplicity and strength of the speed changing elements and their operating mechanism. In the five speed transmission a single shifter lever is employed and this lever in its various positions actuates forks of known type for the purpose of meshing the gears for different speeds in appropriate combinations. Further, in securing each change of speed only a single gear needs to be moved, the spline shaft having slidably mounted thereon only three change speed gears, any one of which may be picked up by the shifter lever through proper manipulation when a speed change is to be accomplished. Not only is the improved transmission characterized by simplicity and fewness of parts in this one respect but it is to be noted that a minimum number of gears is to be found within the box for the securing of such a large number of speed ratios.

These and other objects and advantages of the improved transmission will appear to one skilled in the art at greater length in connection with the detailed description of the illustrated embodiment shown in the accompanying drawings, wherein—

Figure 1 is a view in vertical section through the improved transmission as housed in a suitable casing.

Figure 2 is a view in transverse section through the gear set shown in Figure 1 and taken on the planes indicated by the broken lines 2—2 of Figure 1 and looking in the direction of the arrows.

Figure 3 is a schematic view showing all of the gears of the transmission developed in a single plane in order that their inter-relation for different speed ratios may be more readily understood.

The embodiment of the improved transmission illustrated herein is for a five speed forward and reverse box for use in a motor vehicle, and particularly a truck, but it is to be understood that certain features of the invention may be equally advantageous in a transmission having a different number of speed ratios and designed for work of some other character.

In the drawings the prime mover shaft $a$ is indicated as journaled in the bearings $b$ in the end wall of the gear case $c$, this shaft carrying at its inner end a constantly rotating spur gear $a'$ and a jaw clutch $a^2$, an inboard bearing $d$ in a web $c'$ of the case being provided for the gear $a'$. A spline shaft $e$ is journaled rotatably within the case in co-axial relation with the drive shaft $a$, the inner end of the spline shaft rotating on a bearing $e'$, the race member for which may be carried in the end of the gear $a'$. The other end of the spline shaft $e$ may be journaled as usual in the end wall of the case as in a bearing $f$. On the spline shaft $e$ are feathered three change speed gears $g$, $h$ and $i$ of different diameters and engaged respectively by forks $g'$, $h'$ and $i'$, which may be picked up in any known manner by a single shifter lever, indicated at $k$. The invention is not concerned with the details of construction of the shifting mechanism, except in so far as the construction and arrangement of the gears permit their operation by a single lever.

In the box $c$ is also journaled what will be hereinafter termed the first counter shaft $l$, bearings $l'$, $l^2$ being provided therefor at opposite ends in the case. At one side of the bearing $l'$ is secured to the projecting end of the shaft $l$ a spur gear $m$ which is in constant mesh with the spur gear $a'$ on the drive shaft $a$. At the other side of the bearing $l'$ are keyed, or otherwise secured to the shaft $l$, spur gears G H with which may be meshed selectively the sliding gears $g$, $h$, respectively. Intermediate the ends of the first counter shaft $l$ is revolubly mounted a sleeve $n$ on which are cut or otherwise provided compound gears $n^1$, $n^2$ which may be engaged by the sliding gears $h$, $i$, respectively. On the remote end of the shaft $l$ is cut or otherwise provided a pinion $l^3$ with which meshes constantly a gear L keyed or otherwise secured to a second counter shaft L′ journaled rotatably in the casing $c$. The second counter shaft L′ has thereon a second gear $L^2$ which is in constant mesh with one of the compound gears $n^2$ on the sleeve $n$. The sliding gear $i$ may be meshed with the gear L on the shaft L′ in order to effect reverse speed.

Thus far, the elements have been described in their physical relation to one another with special reference to the gear casing $c$ and the function of each has been indicated briefly. For an understanding of the coordinated functioning of the parts, however, reference is to be had to Figure 3. Fifth speed is direct and is gotten by sliding the gear $g$ towards the jaw clutch $a^2$ until the cooperating clutch teeth $g^2$ on the face of the gear $g$ engage therewith. At this time the spline shaft $e$ rotates with the drive shaft $a$. A comparatively slight reduction is provided between fifth speed and fourth speed in order that shifting into fourth will be easy, a condition not heretofore generally realized. When the jaw clutch $g^2$ is disengaged from the clutch $a^2$, the gear $g$ is free to be slid into mesh with the gear G fixed on the first counter shaft $l$. Since the gears $a'$ and $m$ are in constant mesh the first counter shaft $l$ will constantly revolve. The fourth speed is obtained through meshing of the gears $g$, G. For third speed the gear $h$ is slid into mesh with the gear H. For second speed the gear $h$ is slid in the opposite direction into mesh with the compound pinion $n'$ on the freely revolving sleeve $n$. The power is applied to the gear $n'$ for rotation of the gear $h$ and the spline shaft $e$ by passing through the constant mesh gears $l^3$, L, $L^2$, $n^2$. First speed is obtained by sliding the gear $i$ into mesh with the compound pinion $n^2$. Power is delivered in the manner just indicated. Reverse speed, as indicated hereinbefore, is obtained by sliding the gear $i$ into mesh with the gear L.

From the description given it will be appreciated that the transmission set provided is, to all intents and purposes, as simple and compact in construction and operation as the accepted types of three and four speed transmission, the necessary elements for the additional speed ratio being included without adding to the bulk of the set or necessitating employment of special selector devices therefor. Only twelve gears are used for obtaining six speeds, that is, five speeds forward and one reverse. Single sliding gears, only three in number, are needed in order to obtain these six speeds. The difficulties attending the manufacture of double sliding gears and the complication of their operation are avoided. All of the gears within reasonable limits are uniformly graduated in size, that is to say, there are no such great differences in pitch diameters as result in unduly high tooth speeds or tooth stresses nor are the shafts and gears subjected in any instant to deteriorating twisting and torsional stresses. The use of compound gears for two of the speeds makes it possible to secure this uniform graduation in pitch diameters with the resulting compactness and longer life. The box itself for the transmission is short and the shafts therein are correspondingly stiff and insure quiet operation. Manufacturing and engineering requirements are entirely satisfied in the simplicity and accessibility of all of the elements.

As indicated hereinbefore some of the devices of the improved transmission may be adapted to boxes for other conditions of use without departing from the spirit of the invention.

I claim as my invention:

1. Change speed transmission of the selective type including a spline shaft, change speed gears slidable thereon selectively, a first counter shaft having gears rotatable therewith to be engaged by certain of said first named gears selectively, a compound gear rotatable freely on said counter shaft and adapted to be engaged selectively by certain of said first named gears and means to drive said compound gear.

2. Change speed transmission of the selective type including a spline shaft, single change speed gears slidable selectively thereon, a first counter shaft having gears thereon to be engaged selectively by certain of said first named gears, a compound gear revoluble freely on said counter shaft and adapted to be engaged selectively by certain of said first named gears and a second counter shaft driven from said first named counter shaft by constant mesh gears and having thereon a gear in constant mesh with one of said compound gears.

3. Change speed transmission for five speeds forward and reverse including a spline shaft having three single slidable gears thereon, a drive shaft having a gear thereon, a first counter shaft having a gear in constant mesh with the gear on said drive shaft, two gears carried with the said counter shaft for engagement selectively by certain of said gears on said spline shaft, a compound gear revoluble freely on said counter shaft and engageable selectively by certain of said sliding gears, a pinion carried with said counter shaft, and a second counter shaft having two gears thereon, one of said gears being in constant mesh with said pinion and the other of said gears being in constant mesh with one of said compound gears.

4. In a change speed transmission, a counter shaft, a compound gear revoluble freely thereon, a pinion on the counter shaft, and a second counter shaft carrying a gear in constant mesh with said pinion and a gear in constant mesh with one of said compound gears.

5. In a change speed transmission for five speeds forward and reverse, the combination driving and driven shafts including a spline shaft, gears of different ratio to transmit the driving torque to the driven shaft, respectively, a counter shaft on which said gears are carried, three single gears slidable on the spline shaft selectively to coact with the first-named gears, respectively, to effect all five of said speed changes, forks for the respective sliding gears, and a single shifter lever engaging said forks selectively.

6. Change speed transmission including a driven shaft and a counter shaft, sliding gears on one of said shafts, fixed gears on the other of said shafts for selective engagement by the sliding gears, a second counter shaft driven from the shaft having the gears fixed thereon and additional gears to effect a compound reduction in two of the speed changes and interposed operatively between the shaft having the gears fixed thereon and the sliding gears.

7. Change speed transmission, including a drive shaft, a driven shaft in line therewith, a counter shaft, engageable gears on the respective shafts, including a compound gear mounted loosely on one of said shafts, certain of said gears being slidable selectively whereby five forward speed changes and reverse may be effected between the drive shaft and the driven shaft, and a box in which said shafts are journaled, the driven shaft being journaled at its inner end in the drive shaft.

This specification signed this 15th day of August, 1921.

ALEXANDER GRISWOLD HERRESHOFF.